United States Patent
Brecht, Jr.

[15] 3,664,378
[45] May 23, 1972

[54] VALVE

[72] Inventor: William F. Brecht, Jr., 141 East Atlantic Ave., Audubon, N.J.

[22] Filed: Mar. 9, 1970

[21] Appl. No.: 17,821

[52] U.S. Cl. .................................................. 137/635
[51] Int. Cl. ............................................... F16k 31/44
[58] Field of Search ........................ 137/635, 82, 84

[56] References Cited

UNITED STATES PATENTS

| | | | |
|---|---|---|---|
| 2,267,976 | 12/1941 | Hermann | 137/635 X |
| 3,181,547 | 5/1965 | Bennett | 137/82 |
| 2,517,051 | 8/1950 | Swenson | 137/84 UX |
| 2,635,618 | 4/1953 | Moore | 137/85 |
| 2,724,398 | 11/1955 | Higgins, Jr. et al. | 137/84 |
| 2,950,729 | 8/1960 | Hartz | 137/85 |
| 3,173,437 | 3/1965 | Adams | 137/82 |
| 3,223,102 | 12/1965 | Kies | 137/82 |

*Primary Examiner*—Samuel Scott
*Attorney*—Jackson, Jackson & Chovanes

[57] ABSTRACT

A valve having a body and a shaft moving longitudinally within the body, wherein the shaft selectively opens and closes concentric annular orifices which function either in a balanced condition or unbalanced condition.

5 Claims, 25 Drawing Figures

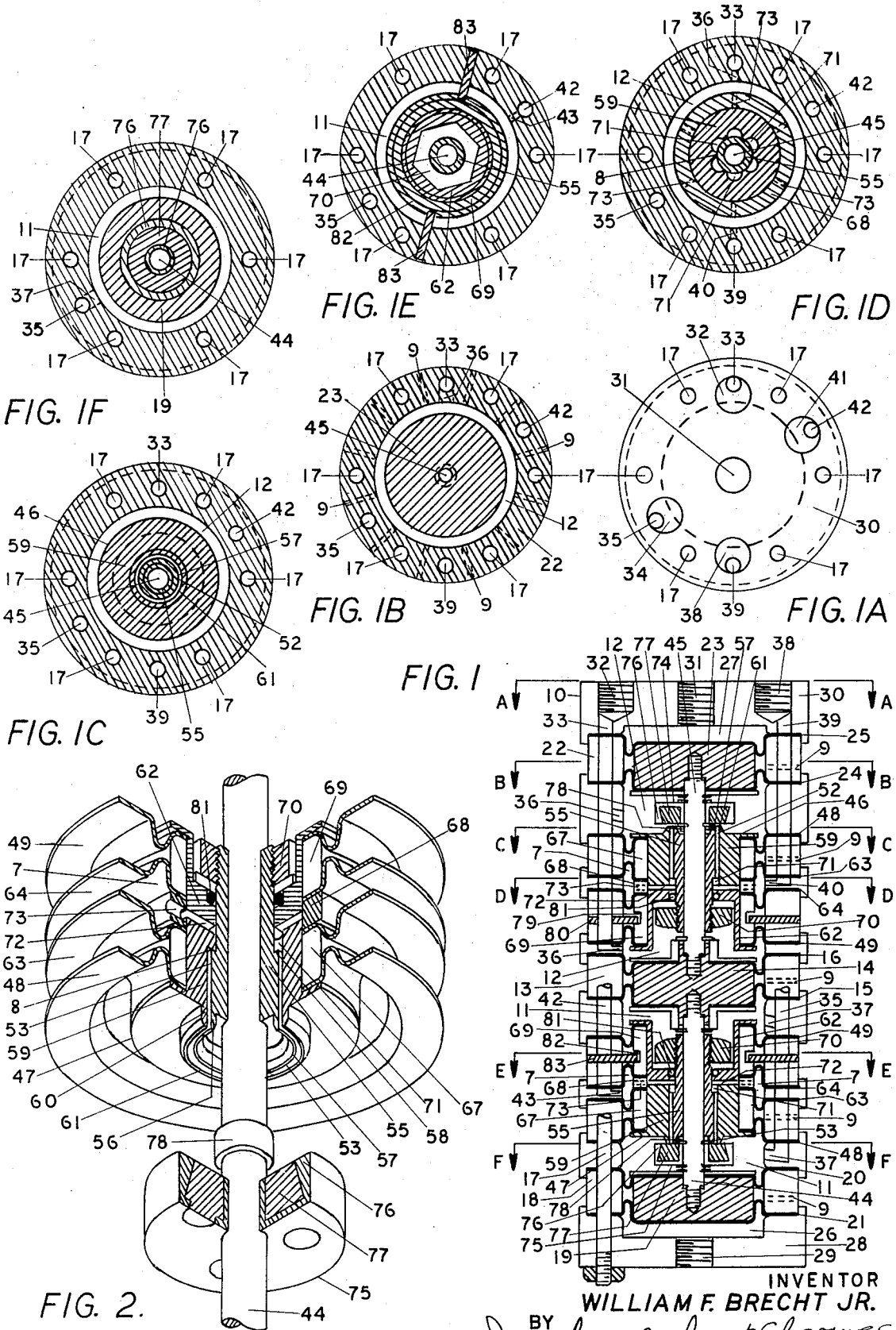

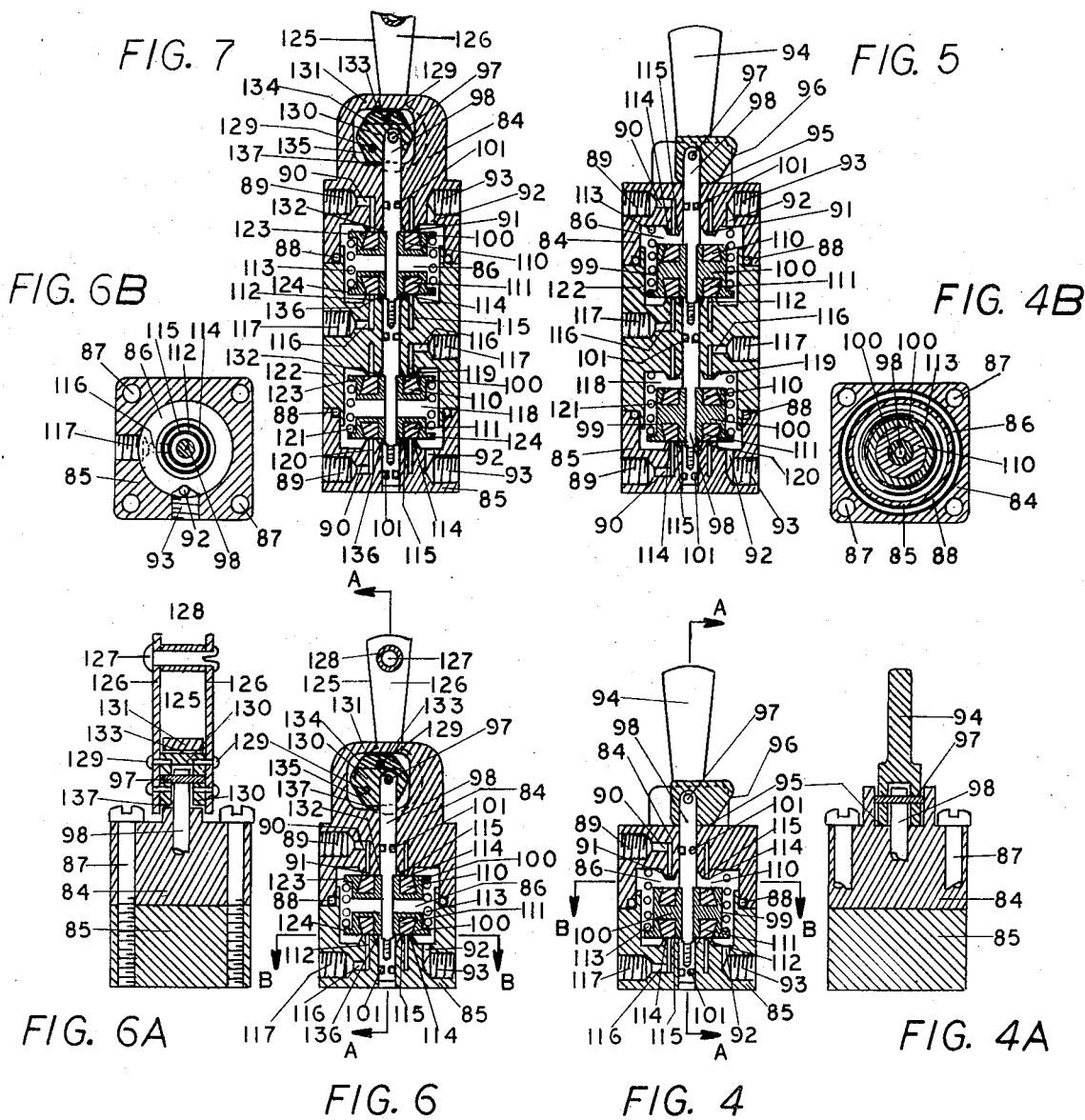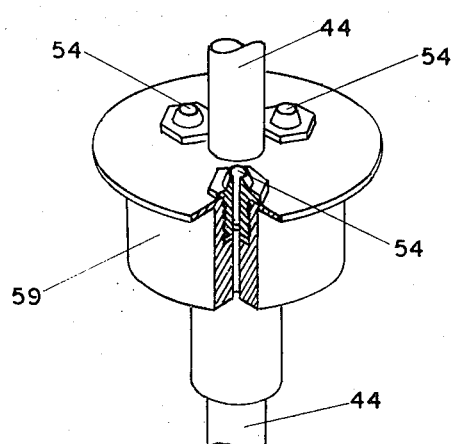

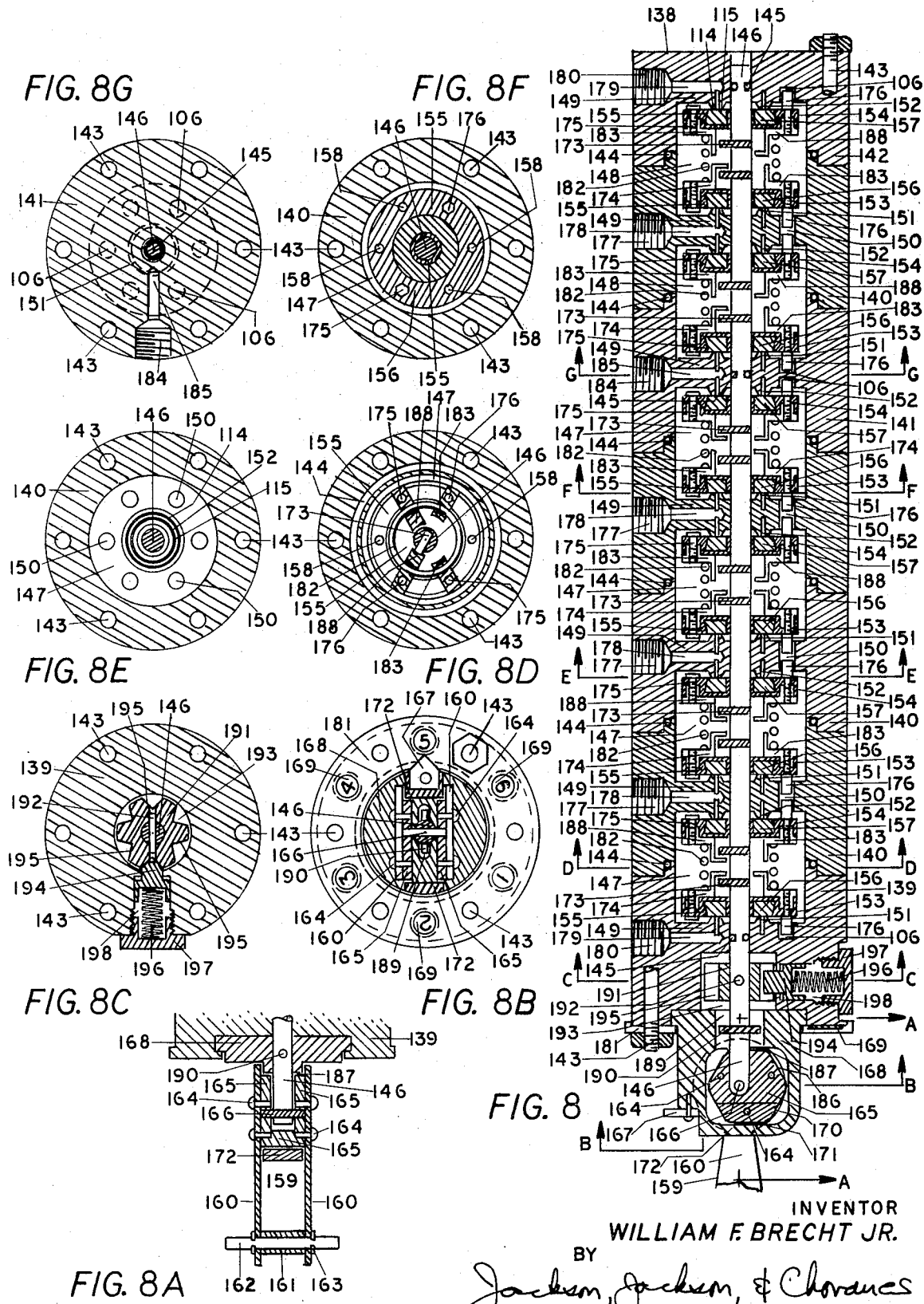

VALVE

DISCLOSURE OF INVENTION

A purpose of this invention is to provide a valve which alternatively can be either in the form of an absolute balanced valve, or an unbalanced valve.

A further purpose of this invention is to provide a fluid valve with a material, fluid sequestrator in the form of a stationary partition of the valve pressure chamber body or a moveable piston, sealed in the valve pressure chamber, in which is contained a concentric annular orifice groove or a concentric series of individual ports that are isolated from the direct reciprocating movement or action of the concentric control shaft, wherein the material fluid sequestrator allows the orifice internal fluid passageways to be isolated from the volume of the pressure chamber to which the said orifice communicates.

A further purpose of the concentric annular orifice groove, or a concentric series of individual ports contained in the movable or stationary material, fluid sequestrator is so that it may be used in any pneumatic or hydraulic device to control the fluid flow movement or regulate fluid pressure.

A further purpose of the movable material, fluid sequestrator or balanced flow-through piston is to provide in a balanced fluid valve means to maintain an invariable responsiveness and sensitivity throughout all valve internal fluid pressure changes, all internal fluid flow control component positions, and all external actuating forces.

A further purpose of this invention is to provide an absolute balanced valve, comprising a moveable, sealed, material, fluid sequestrator in the form of a piston containing a concentric annular orifice groove or a concentric series of individual ports, a reciprocating control shaft, a concentric annular valve seat, and rubber rolling diaphragms which are all combined into a working function so as to produce a frictionless, reciprocating sealed unit in the balanced valve fluid pressure chamber into which flows the pressurized fluid. The fluid may be under any pressure. This pressure exerts a constant linear force in opposing directions against the rolling diaphragm pressure areas, thus achieving a perfect frictionless balance, or a zero linear output force in opposing directions. The absolute balance is maintained through all valve orifice openings and closings, regardless what fluid pressure is maintained in the balanced valves reciprocating sealed pressure chamber, except when it has to overcome the force of any extra internal spring arrangement.

A further purpose of this invention is to provide a absolute balanced valve with one or a multiple of connecting reciprocating sealed fluid pressure chambers that can be programmed to actuate their individual normally open or normally closed two-way valves simultaneously or independently sequenced for timed intervals between valve actuations in relation to the travel distance of the control shaft.

A further purpose of this invention is to provide the absolute balanced valve with a reciprocating sealed pressure chamber which is unvaried in response due to high or low temperature changes.

A further purpose of this invention is to enable the absolute balanced valve to be used as an environmental, leak proof valve.

A further purpose of this invention is to enable the absolute balanced valve to eliminate all metal compression springs and utilize the built-in spring gradient of the rubber rolling diaphragms when they are moved in either direction from their neutral plane position.

A further purpose of the moveable, sealed, material, fluid sequestrator containing the concentric annular orifice groove or ports is to provide the design of a flow through a balanced piston, through whose central bore the control shaft reciprocates independently unless it is programmed to actuate the piston.

A further purpose of the moveable, sealed, material, fluid sequestrator in the form of a balanced flow-through piston is that it contains a concentric annular orifice groove or ports, whose orifice depth extends halfway through the piston body where it makes a right angle bend and extends through, to the piston outer wall where the orifice passageway is sealed between the piston wall and the pressure chamber wall by the balanced pistons two inner rolling diaphragms and continues through an exhaust passageway contained in the side wall of the valve body. The piston thus becomes a moveable material, fluid sequestrator which surrounds and isolates the orifice groove or ports from the volume of the pressure chamber and the reciprocation of the control shaft.

A further purpose is to provide a fluid valve whose concentric or annular orifice, groove or ports encircle a concentric actuating shaft or control stem to form a material, annular sequestrator between the inner wall of the concentric annular orifice groove or ports and the wall of the central bore containing the concentric control shaft.

A further purpose is to provide a fluid valve with a concentric actuator shaft or control stem whose reciprocating movements bypass the concentric annular orifice groove or ports contained in a moveable or stationary chamber partition through its central bore without actuating the valve orifice, unless otherwise programmed to do so.

A further purpose of the concentric actuating shaft or control stem is to provide a continuous, variable length, unit which can be programmed to actuate any multiple of fluid valves combined into a lineal length.

A further purpose of the concentric actuating shaft or control stem is to provide a continuous variable length element which connects all internal moving parts into one programmed reciprocative function.

A further purpose is to provide an unbalanced fluid valve. The cause of this unbalanced condition is that the concentric annular orifice groove or ports are contained in a stationary wall section or material, fluid sequestrator, in the valve's pressure chamber which causes a greater fluid pressure force upon the top surface effective pressure area of the concentric, spring loaded, floating valve seat, due to the sealed orifice area which is subtracted from the valve seat's bottom surface effective pressure area.

A further purpose is to enable an unbalanced fluid valve to combine any multiple of valve units into a linear length, and whose internal pressure chambers are voluminously inter-connected into one embodied pressure sealed chamber in which is contained a community of two-way valves that have orifices, either in the shape of a concentric annular groove or a concentric series of individual ports which are contained in a stationary material, fluid sequestrator, and sealed as a result of the concentric spring loaded floating valve seat that is selectively actuated by means of the osciallting control shaft that contains a fixed linear row of actuating pins extending at a right angle to the control shaft surface and when programmed, engages against any one of the removable, rotary index, actuator pin stops that is secured to the top surface of the floating valve seat causing it to stay in a position, which can be programmed to input or exhaust pressurized fluid to or from the embodied pressure chamber or the fluid source, until the oscillating control shaft is actuated back to its neutral position.

A further purpose is to enable an unbalanced fluid valve to combine any multiple of valve units into a linear length and whose spring loaded, floating valve seats are simultaneously actuated to open or closed positions by the reciprocating concentric control shaft.

Further purposes appear in the specifications and in the claims.

In the drawings, I have chosen to illustrate some only of the numerous embodiments in which my invention may appear, selecting the forms shown from the standpoints of convenience in illustration, satisfactory operation and clear demonstration of the principles involved.

FIG. 1 is a vertical cross-sectional view taken approximately through the center of the valve of the invention.

FIG. 1A is an end view taken along the line A—A of FIG. 1 showing the arrangement of the input and exhaust ports, and fluid passageways.

FIG. 1B is a cross-sectional view taken along the line B—B of FIG. 1 showing one of the piston heads which support the rubber rolling diaphragms and also the diaphragm air vents.

FIG. 1C is a cross-sectional view taken along the line C—C of FIG. 1 showing an end view of the flow-through, balanced piston and its centralized, concentric annular orifice groove.

FIG. 1D is a cross-sectional view taken along the line D—D of FIG. 1 showing a portion of the flow-through piston where the annular orifice groove makes a right angle bend and goes through the side wall of the piston.

FIG. 1E is a cross-sectional view taken along the line E—E of FIG. 1 showing the flow-through piston's travel stop groove, the travel stop pins and the nut which fastens the flow-through piston together.

FIG. 1F is a cross-sectional view taken along the line F—F of FIG. 1 showing the valve orifice seal, piston head for the diaphragm and the tie rods.

FIG. 2 is a partial perspective view, broken away, of one form of the balanced flow-through piston showing the concentric, annular orifice groove, the continuous shaft, and the valve orifice sealing seat.

FIG. 3 is a perspective view of a portion of an alternate form of balanced flow-through piston having a concentric series of individually spaced ports, partially broken away.

FIG. 4 is a vertical cross-sectional central view of a two-position, three-way valve.

FIG. 4A is a vertical cross-sectional view taken along the line A—A of FIG. 4.

FIG. 4B is a cross-sectional view taken along the line B—B of FIG. 4 showing the valve orifice seal.

FIG. 5 is a vertical cross-sectional central view of a two-position, four-way valve.

FIG. 6 is a vertical cross-sectional central view of a three-position, three-way valve.

FIG. 6A is a vertical cross-sectional view taken along the line A—A of FIG. 6.

FIG. 6B is a cross-sectional view taken along the line B—B of FIG. 6 showing the concentric, annular orifice groove and the arrangement of the input and output ports.

FIG. 7 is a vertical cross-sectional central view of a three-position, four-way valve.

FIG. 8 is a vertical cross-sectional view taken approximately through the center of a three-position, multiple-way valve.

FIG. 8A is a vertical cross-sectional view taken along the line A—A of FIG. 8 showing the cam lever rotary actuator.

FIG. 8B is an end view taken along the line B—B of FIG. 8, showing a cut-away section of the cam lever rotary actuator and its numbered, stop positions.

FIG. 8C is a cross-sectional view taken along the line C—C of FIG. 8, showing the rotary index stop mechanism.

FIG. 8D is a cross-sectional view taken along the line D—D of FIG. 8 showing a top view of the floating valve orifice seal, its movable actuator stops, the actuator pin extending from the continuous shaft, and the valve seat compression spring.

FIG. 8E is a cross-sectional view taken along line E—E of FIG. 8 showing the concentric annular orifice groove and the pressure chambers fluid passage holes.

FIG. 8F is a cross-sectional view taken along the line F—F of FIG. 8 showing the packing side view of the floating valve orifice seal and the rotary stabilizer pin.

FIG. 8G is a cross-sectional view taken along the line G—G of FIG. 8 showing a sealed-separator valve section which divides the two individual pressure chambers, and the input port and passageway that connects into the two concentric annular orifice grooves.

Describing in illustration but not in limitation and referring to the drawings:

Referring to FIG. 1, 1A to 1F, which shows only one form of a multiple of valve combinations which can be devised of the absolute balanced fluid valve whose assembled metal or plastic body 10 that is fastened together with tie rods 17 is divided into two individually sealed, balanced pressure chambers 11 and 12 which are separated and sealed by body section 13, containing air vents 9 to admit the outside ambient fluid pressure to act as a reference for the effective pressure area for the diaphragms to compute against, the piston 14 and rolling diaphragms 15 and 16.

Both of the balanced pressure chambers 11 and 12 have ends which are sealed and separated from the fluid pressure actuator compartments 26 and 27 by lower body section 18, piston 19, rolling diaphragm 20 and the upper body section 22, piston 23, rolling diaphragm 24.

The lower actuator compartment 26 is sealed by rolling diaphragm 21 and is housed in the end cap section 28 which contains an actuator pressure port 29.

The upper actuator compartment 27 is sealed by rolling diaphragm 25 and is housed in the end cap section 30 which contains an actuator pressure port 31. A fluid pressure input port 32 connects to passageway 33 and inlets 36 through which pressurized fluid enters into balanced chamber 12.

A fluid pressure input port 34 connects to passageway 35 and inlets 37, through which pressurized fluid enters into the balanced chamber 11. A fluid pressure output port 38 connects to passageway 39 and outlet 40 through which pressurized fluid flows out of chamber 12. A fluid pressure output port 41 connects to passageway 42 and outlet 43 through which pressurized fluid flows out of chamber 11.

When pressurized fluid is admitted to passageways 32, 33, 36 and 34, 35, 37 and enters chambers 11 and 12 filling their volumes to capacity, the fluid maintains a balanced linear pressure force in opposing directions by means of the identically effective pressure areas of rolling diaphragms 15 and 20 that are contained in chamber 11, in a fixed linear position by the diaphragm support pistons 14 and 19 which are secured to the ends of the fixed length of the concentric control shaft 44, and also the identically effective pressure areas of rolling diaphragms 16 and 24 that are contained in chamber 12, in a fixed linear position, by the diaphragm support pistons 14 and 23 which are secured to the ends of the fixed length of the concentric control shaft 45. Control shaft 45 combined with control shaft 44 unite both chambers 11 and 12 into one balanced, frictionless reciprocating unit except for the pre-planned spring characteristic of the rolling diaphragms 15, 16, 20, 21, 24, 25 which is attained by stopping, at a predetermined linear position, the combined chambers 11 and 12 unit above and below the rolling diaphragms neutral plane or centering position, thus causing the combined chambers 11 and 12 unit to acquire a spring loaded upward force.

The pressure chamber interiors 11 and 12 are each divided into two communicating voluminous compartments, by the balanced flow-through pistons 46 and 47, whose ends are sealed, except for the central bore, by the rolling diaphragms 48 and 49 whose effective pressure are identical, thus becoming two balanced, frictionless reciprocating units, except for the pre-planned diaphragm spring force which will be explained later.

The balanced flow-through pistons 46 and 47 are reciprocating two-way valves which each contain a concentric annular orifice groove 52 and 53, or a concentric series of individual orifice ports 54 as shown in FIG. 3, which communicate with the valve sealing seats 74 or 75 that are secured to the control shafts 44 or 45. The pistons 46 and 47 are comprised of a concentric metal sleeve hub 55, through whose central bore the control shaft 44 or 45 independently reciprocates, and has located at its front end, formed around its outside preiphery, a annular beveled ring 56 tapering to an inner sealing knife edge 57 of th concentric annular orifice groove 52 or 53. The front end cap has formed on its end surface, located around the periphery of its concentric bore, a annular beveled ring 60 tapering to an outer sealing knife edge 61 of the annular orifice groove 52 or 53.

The sleeve hub 55 has, located in a fixed central position, a annular shoulder 58 which abutts the annular shoulder 8 located on the front end cap 59, thus by tightening nut 70, which is threaded onto the back end of the sleeve hub 55, it compresses the back end cap 62 toward the front end cap 59, sealing between them the rolling diaphragms 48, 49, 63, 64, the diaphragm annular metal spacers 67, 68, 69, and the O-ring 81. This tightening action combines all the above mentioned piston items into one, sealed, moveable, material, fluid sequestrator which surrounds the concentric annular orifice grooves 52 or 53, or the concentric series of individual ports 54, FIG. 3, and their connecting passageways, thus isolating them from the fluid volume of the pressure chamber 11 or 12, and the reciprocation of the shafts 44 or 45. The O-ring 81 seals the back end of the balanced pistons 46 and 47, keeping the pressurized fluid in chambers 11 and 12 from entering the piston's internal flow-through passageway when the annular orifice grooves 52 and 53 are in a opened or closed position.

In operation, the inner volume of chamber 11 is filled to capacity with pressurized fluid, whose flow is sustained in a state of rest due to the 2-way valve closed position in combination with the concentric annular orifice groove 53 and its union with the valve sealing seat 75 which is secured to the shaft 44.

When the inner volume of chamber 12 is filled to capacity with pressurized fluid, its flow continues to travel through the balanced pistons 46 concentric annular orifice groove 52 whose depth extends to the annular shoulder 8, located on the front end cap 59, which contains a concentric series of individual semi-round outlet holes 71 that communicate with an annular separation 72 contained between the piston front end cap 59 and the back end cap 62 which enables the annular orifice fluid passageway to make a right-anble bend and continue through the outlet holes 73, radially spaced in the annulus of the metal spacer 68 into the voluminous separation 7 contained and sealed between the balanced piston's 46 outer wall and the valve body 10 inner wall by the two rolling diaphragms 63 and 64, whose effective pressure areas are identical. The fluid flow then continues through outlet 40, passageway 39 and output port 38 to the valve 10 output destination.

When pressurized fluid is admitted to port 31 and fills the volume of the upper actuator compartment 27 to capacity, it causes an unbalanced linear force on the effective pressure area of the rolling diaphragm 25 and support piston 23 which moves the entire internal unit, comprised of the pressure chambers 11 and 12, with the exception of the balanced pistons 46 and 47, in a downward motion from its upward diaphragm spring force, stop position.

During the first phase of the valve 10 actuation, the reciprocating internal unit moves downward a distance of 0.015 inch, moving the shaft 45, contained in chamber 12, which has secured to it in a fixed position, a valve sealing seat 74, which is comprised of a concentric metal container 76 that accomodates the packing 77 in the form of an annulus, of rubber or plastic, which compresses against the annular sealing knife edges 57 and 61, of concentric annular orifice groove 52, whose impression depth in the annulus of rubber or plastic is limited by an annular spacer ring 78 which slides on shaft 45 in between the metal valve seat container 76 and the balanced piston's 46 concentric metal sleeve hub 55 outer surface. The spacer ring serves to prevent the sticking of the rubber or plastic packing against the sealing knife edges 57 and 61, and also carries the balanced piston's 46 upward spring force load in any further downward travel motion.

When the valve seat 74 engages against and seals the annular orifice groove 52 of the balanced piston 46, the area of the sealed orifice 52 is subtracted from the upward force, effective pressure areas in combination of the lower or packing surface of the valve seat 74 and the balanced pressure chamber 12 upper rolling diaphragm 24, thus allowing the downward force, effective pressure areas in combination of the upper surface of the valve seat 74, and the pressure chamber 12 lower rolling diaphragm 16 to have a greater effective pressure area, by the difference of the sealed orifice 52 area.

This unbalanced condition is counterbalanced by means of the balanced flow-through piston 46 whose sealed orifice groove 52 area is subtracted from the downward force, effective pressure area of the balanced pistons 46 upper rolling diaphragm 48 allowing the upward force, effective pressure area of the balanced piston's 46 lower rolling diaphragm 49 to have a greater effective area, by the difference of the sealed orifice 52 area, which combines with the reduced upward, effective pressure areas of valve seat 74 and diaphragm 23, thus obtaining a balanced condition through all opening and closing phases, because all effective pressure areas become identical in opposing directions.

At this point we should explain that the balanced flow-through piston 46 has a upward spring force due to the pre-planned spring characteristic of the rolling diaphragms 48, 49, 63, 64, which is attained by stopping at a pre-determined position, in relation in distance with the valve seat 74, the balanced piston 46 below the rolling diaphragms neutral plane or centering position by means of the annular travel stop groove 79, which is contained in the balanced piston 46 annular metal diaphragm spacer 69, and the travel stop pins 80 whose fixed linear positions in relation to the pre-planned width of the travel stop groove 79, are programmed to control the individual sequenced actuation of the concentric annular orifice groove 52 and valve seat 74, in relation to the reciprocating movement of the combined internal unit comprising of all the components forming the pressure chambers 11 and 12.

This means that any multiple of valve units 10 can be combined in the same linear axis to be individually opened or closed in a pre-planned timed sequence in relation to the travel distance of a single reciprocating actuation force.

Also, during the first phase of actuation, the downward 0.015 inch movement of shaft 44, to which the valve sealing seat 75 is secured, in chamber 11 enables the balanced piston 47, having a downward diaphragm spring force, and the annular spacer ring 78 to move in an unchanged condition with the valve seat 75 which still maintains the two-way valve in chamber 11 in a closed position.

During the second phase of actuation, the internal components are again moved downward the distance of 0.015 inch and are programmed to allow each of the two-way valves in pressure chambers 11 and 12 to maintain a closed position.

During the third phase of the valve 10 actuation, its reciprocating internal unit, comprised of the balanced pressure chambers 11 and 12, moves downward another distance of 0.015 of an inch to its terminal stop position due to the closed position of the two-way valve in chamber 12 whose valve sealing seat 74 via the spacer sleeve 78 is engaged with the balanced flow-through piston 46, whose annular travel stop groove 79 is in contact with the travel stop pin 80 in its predetermined fixed linear position, thus stopping all downward movement.

Also during the third phase of the valve 10 actuation, the balanced flow-through piston 47, contained in chamber 11 is maintained in its "second phase" stopped position due to its downward pre-loaded diaphragm spring force which engages at this point, the balanced piston's 47 annular travel stop groove 82 against the travel stop pin 83 in its pre-determined fixed linear position thus enabling the shaft 44 to slide through the central bore of the stopped balanced piston 47. This motion opens the chamber 11 2-way valve by means of a balanced separation between the annular sealing knife edges 57 and 61 of the balanced piston's 47 concentric annular orifice groove 53 and the packing 77, contained in the valve sealing seat 75 which is moved away from the stopped balanced piston's closed position to an open position by means of the downward 0.015 of an inch final travel distance of the shaft 44 to which it is secured in a fixed linear position.

The pressurized fluid, whose flow was maintained in a state of rest in pressure chamber 11, now flows through the balanced piston's 47 internal fluid passageways, 53, 71, 72, and 73, 7 and continues through the outlet passageways 43, 42, 41 to a valve 10 output destination.

When the fluid pressure in the actuator compartment 27 is reduced below the upward spring force of the combined rolling diaphragms of pressure chambers 11 and 12, or a greater fluid pressure is admitted to the lower actuator compartment 26, via the input port 29 located in the end cap 28, then is contained in the upper actuator compartment 27, it thus causes an unbalanced upward force upon the effective pressure area of the rolling diaphragm 21 and its support piston 19 which moves the entire internal unit, made up of the pressure chambers 11 and 12, upward to its terminal unactuated stop position and reversing in sequence the valve's 10 internal functions. The closed position of the two-way valve in chamber 11 whose valve sealing seat 75 via the spacer sleeve 78 is engaged against the balanced flow-through piston 47, which moves it upward until its annular travel stop groove 82 abuts with the travel stop pin 83 in its predetermined fixed linear position, thus stopping all upward movement.

Referring now to FIG. 4, including section views 4A, 4B, 6B, which show a normally open, two-position, three-way unbalanced valve that consists of a two part metal or plastic housing 84 and 85, containing a fluid pressure chamber 86, which are secured together by the screws 87 and whose interjoining surfaces are sealed by the O-ring 88 and its central shaft bores by the O-rings 101 which are contained in the shaft 98. Pressurized fluid is admitted to the pressure chamber 86 by means of the input port 89, inlet passageway 90 and the concentric annular orifice groove 91, or a concentric series of individual orifice ports 54, FIG. 3, which then fills the chambers 86 volume before continuing through the outlet passageway 92 and the output port 93 to the valves output destination.

To exhaust the pressurized fluid from its outside destination, the actuating lever 94 is rotated clockwise, so as to enable the lever's normal bottom surface 95 to be superseded by an eccentric actuating surface 96 which is a greater distance from the pivot pin 97, than the normal bottom surface 95.

The lever 94 is connected to the control shaft 98 by means of the pivot pin 97, that when actuated, moves the shaft 98 in an upward motion, bringing with it the concentric valve sealing seat 99, being secured to the shaft 98 in a fixed position, and comprised of a metal container 100 that accomodates two separate packings 110 and 111 in the form of an annulus of rubber or plastic, from its normally open position, which seals the lower concentric annular orifice groove 112, and is always returned to this position due to the downward force applied to the valve seat 99, via the control shaft 98, by means of the compression spring 113. This upward travel engages the valve seat 99 against the knife sealing edges 114 and 115 of the upper concentric annular orifice groove 91, thus sealing it and stopping the input fluid flow and causing a simultaneous exhausting of the pressurized fluid from the valves output destination, through port 93, passageway 92, into the pressure chamber 86 and continuing through the concentric annular orifice groove 112, passageway 116 and the exhaust port 117 until the lever 94 is actuated back to its normal open position.

Referring now to FIG. 5, including section views 4A, 4B, 6B which show a two-position, four-way unbalanced fluid valve being identical in operation to the 3-way valve shown in FIG. 4, with the exception of the addition of the body section 122 which forms a second pressure chamber 118 whose fluid input annular orifice groove 120, and valve sealing seat 99, are maintained in a closed position, by the compressing spring 121 whose compression force rate overcomes the maximum pressure force product of the sealed orifice groove's 120 inner area which forces against the packing surface 111 of the valve seat 99 that is secured to the control shaft 98 and whose upward movement, when actuated, seals the fluid flow exhausting through the annular orifice groove 119 and simultaneously opens the fluid input annular orifice groove 120 which admits the pressurized fluid to the chamber 118, from input port 89 and passageway 90, from which the fluid continues its flow through passageway 92, output port 93 to the valve's output destination.

Referring now to the FIG. 6, including section views 4B, 6A, 6B which show a three-position, three-way, unbalanced fluid valve consisting of a two part metal or plastic housing 84 and 85, containing a fluid pressure chamber 86, which is secured together by the screws 87 and whose interjoining surfaces are sealed by the O-ring 88 and its central shaft bores by the O-rings 101 which are contained in the control shaft 98.

Pressurized fluid is admitted to the pressure chamber 86 by way of the input port 89, the inlet passageway 90 and the concentric annular orifice groove 91, which is sealed from the volume of the pressure chamber 86, by means of the floating, spring loaded, valve sealing seat 123, being comprised of a metal container 100, that accomodates the packing 110 in the form of an annulus of rubber or plastic, which slides on the control shaft 98. The floating valve seats 123 and 124 are maintained in a closed position by means of the compression force rate of the spring 113 which is positioned between the upper floating valve seat 123 and the lower floating valve seat 124, whose annulus packing 111 seals the exhaust annular orifice groove 112 from the volume of the pressure chamber 86, thus causing the annular orifice grooves 91 and 112 to be in a normally closed position when the actuating lever 125 is in a neutral position. The lever 125 is comprised of the two lever handles 126 being secured at the top by a rivet 127 and a spacer sleeve 128, and secured at the bottom by machine screws 129 which fasten the handles 126 to the actuating cam 130, whose eccentric surfaces control the reciprocation of the shaft 98 which is connected to the cam 130 by means of the pivot pin 97. When the lever 125 is rotated clockwise to its fluid input position, it enables the eccentric cam surface 134 to supersede the neutral position of the cam's 130 upper surface 133, which engages against the upper actuating surface of the opening in the yoke 131, thus causing a downward movement of the shaft 98, which passes through the central bore of the valve seat 124 without actuating it from its sealed position of the annular orifice groove 112, but whose annular shoulder 132 engages against the floating, spring loaded valve seat 123, disengaging it from the knife sealing edges 114 and 115 of the annular orifice groove 91, through which the pressurized fluid is admitted into the pressure chamber 86, and through the outlet passageway 92, and the output port 93 to its output destination. To exhaust the pressurized fluid from its output destination, the actuating lever 125 is rotated counterclockwise, back to its neutral "off" position, then continuing to its exhaust position enabling the eccentric cam surface 135 to supersede the neutral position of the cam's 130 lower surface 137, which engages against the lower actuating surface of the opening in the yoke 131, thus causing an upward movement of the shaft 98 which passes through the central bore of the valve seat 123 without actuating it from its sealed position of the annular orifice groove 91, but whose annular shoulder 136 engages against the floating, spring loaded valve seat 124, disengaging it from the knife sealing edges 114 and 115 of the annular orifice groove 112 which is now in an open position to exhaust the pressurized fluid through the passageway 116, the exhaust port 117, into the outside atmosphere from the valves output destination, via the output port 93, the passageway 92 and the pressure chamber 86, until the lever 125 is actuated back to its neutral position, thus closing all valve annular orifice grooves 91 and 112.

Referring now to FIG. 7, including section views 4B, 6A, 6B, which show a three-position, four-way, unbalanced fluid valve being identical in operation to the three-way valve shown in FIG. 6, with the exception of the body section 122 which forms a second separate pressure chamber 118 and valve unit, whose fluid input and output function is governed by which of the ports 89 and 117 will be chosen for fluid input or exhaust.

Referring now to FIG. 8, including the section views 8A to 8G which show a three-position, multiple-way, unbalanced fluid valve, whose housing 138 consists of the top end cap 139, the interchangeable valve sections 140, the pressure chamber separator valve section 141, and the lower end cap 142, which are all secured together by means of the tie rods 143 and whose interjoining surfaces are sealed by the O-rings 144 and its central shaft bores by the O-rings 145 contained in the shaft 146, that when all items above are assembled, form two separately sealed pressure chambers 147 and 148.

The pressure chamber 147 is internally contained between the top end cap 139, any multiple of interchangeable valve sections 140 and the separator valve section 141 which are voluminously inter-connected into one embodied pressure sealed chamber, by means of the passageways 150 bored through the material sequestrator 149, in which is contained a community of two-way valves being comprised of the concentric annular orifice grooves 151 and 152 or a concentric series of individual orifice ports 54, FIG. 3, and are normally sealed by the floating, spring loaded, annular valve sealing seats 153 and 154, which are comprised of the metal container 155 that accomodates the packings 156 and 157 in the form of an annulus of rubber or plastic, which slides freely on the control shaft 146.

The pressure chamber 148 is internally contained between the separator valve section 141, the valve section 140 and the lower end cap 142 whose assembled combination is identical in function of all the components of chamber 147.

In operation, the actuating lever 159, shown in a neutral position, is comprised of the two lever handles 160, which are secured at the top by a spacer sleeve 161, the turning pin 162 which are held in place by the retaining rings 163, and secured at the bottom by machine screws 164 which fasten the handles 160 to the actuating cam 165 whose eccentric surfaces control the reciprocation of the shaft 146 and are connected to one another by means of the pivot pin 166. Before any function of actuation is performed, the rotary indexing position is examined by the radial relation of the indicator 167, which is fastened to the handles' rotary base 168, to the radially positioned, index stop, numbered disc's 169, which are held in place by the end cap plate 181, and are each programmed for an individual actuating sequence.

When the actuator lever 159 is rotated to a clockwise position, it enables the eccentric cam surface 170 to supersede the neutral position of the cam's upper surface 171, which engages against the upper actuating surface of the opening in the yoke 172, which is the top portion of the rotary base 168, thus causing a downward movement of the shaft 146 which passes through the central bores of the floating valve seats 153 and 154 without actuating them unless the fixed linear row of actuating pins 173 that extend from the shaft's surface 146 at a right angle, engage against any of the removable actuator pin stops 174 that are secured to the top surface of the floating valve seats 153, at a selected radial stop sequence, by the screws 175 and the stabilizer pin screw 176 which fasten into the threaded holes 158, and extend from the bottom of the valve seats 153 and 154 and into one of the pressure chamber fluid passage holes 150, or the blind stabilizer pin holes 106 which are contained in the top end cap 139, the lower end cap 142, and the separator valve section 140. This is to keep the valve seats 153 and 154 from turning when the control shaft 146 is rotated. The downward movement of shaft 146 causes the programmed valve seats 153 in the pressure chamber 147, which are in a normally closed position due to the compression force rate of the coil spring 182 which is held between the floating valve seats 153 and 154 by the shoulder on the actuating pin stops 174 and the removable spring holders 183, to be disengaged from the knife sealing edges 114 and 115 of the annular orifice grooves 151 so that the pressurized fluid of the valve 138 output destinations is exhausted back through the output ports 177, the passageways 178, the open annular orifice grooves 151, into the volume of the pressure chamber 147 and out the open exhaust annular orifice groove 151, which is contained in the top end cap 139 and through its passageway 179, the exhaust port 180, and into the outside atmosphere. The downward shaft 146 movement simultaneously causes the programmed valve seats 153 in the pressure chamber 148 to be disengaged from the knife, sealing edges 114 and 115 of the annular orifice grooves 151 and especially the orifice groove 151 which is contained in the material, fluid sequestrator 149 of the chamber separator valve section 141, through which the pressurized fluid is admitted by way of the input port 184 and the passageway 185, into the volume of the chamber 148, where it flows into any other opened orifice groove 151 and continues through their passageways 178, output ports 177, to their output destinations.

When the actuating lever 159 is returned to its neutral "off" position, the upward movement of the shaft 146 disengages the pins 173 from the programmed valve seat pin stops 174, thus reseating the valve seats 153 in their normally closed position due to the coil spring's 182, compression force rate which is greater than the product of the maximum pressure and orifice groove 151 area upon the valve seat 153 packing surface.

When the actuating lever 159 is rotated to a counter-clockwise position, it enables the eccentric cam surface 186 to supersede the neutral position of the cam's lower surface 187, which engages against the lower actuating surface of the opening in the yoke 172, thus causing an upward movement of the shaft 146 which passes through the central bores of the valve seats 153 and 154 without actuating them unless the shaft's actuating pins 173 engage against any of the removable actuator pin stops 188 that are secured to the top surface of the floating valve seat's 154 at a selected radial stop sequence, thus causing the programmed valve seat's 154 in the pressure chamber 147 to be disengaged from the knife sealing edges 114 and 115 of the annular orifice groove's 152 and especially the orifice groove 152 which is contained in the sequestrator 149 of the chamber separator valve section 141, through which the pressurized fluid is admitted, by way of the input port 184 and passageway 185, into the volume of the pressure chamber 147 where it flows into any other opened orifice groove's 152 and continues through their passageways 178, output ports 177, to their output destinations. The upward shaft 146 movement simultaneously causes the programmed valve seats 154 in the pressure chamber 148 to be disengaged from the knife sealing edges 114 and 115 of the annular orifice groove's 152 so that the pressurized fluid of the valve 138 output destinations is exhausted back through the output ports 177, the passageways 178, the annular orifice groove's 152, into the volume of the pressure chamber 148 and out the exhaust annular orifice groove 152, which is contained in the lower end cap 142 and through its passageway 179, the exhaust port 180 and into the outside atmosphere.

When the actuator lever 159 is returned to its neutral "off" position, the downward movement of the shaft 146 disengages the pins 173 from the valve seat pin stops 188, thus reseating the valve seats 154 in their normally closed position due to the compression force rate of the coil springs 182.

To change the radial stop position of the control shaft 146, the actuator lever 159 is rotated in either direction, rotating with it the control shaft 146, by means of the pivot pin 166, which is secured in the lever actuating cam 165, and the rotary base 168, whose upper yoke 172 portion is enclosed by the lever handles 160, which in turn, contributes to the rotation of the shaft 146 by means of its elongated hole 189 which accomodates the pin 190 that is secured in a fixed position in the control shaft 146. The radial stop positions are regulated by the indexing gear 191, which is secured to the shaft 146 by the pin 192, and contained in the compartment 193 of the top end cap 139 which also houses the teflon indexing stop pin 194, in the bore 198, which extends into the compartment 193 and engages against the gears 191 indexing indentations 195, by means of the compression force rate of the coil spring 196 which is compressed against the stop pin 194 by the threaded spring retaining plug 197.

When the gear 191 is rotated against the spring loaded stop pin 194, the angle of the gears indentations 195, wedges against the angle on the stop pin, driving it back till the next indentation comes into position to be engaged by the spring loaded stop pin 194 for the next selected radial stop actuating position.

The reciputation of the shaft 146 is maintained in a straight line motion due to the travel length of the indentations 195 on the indexing gear 191, which slide over the teflon indexing stop pin 194.

Having thus described my invention what I claim as new and desire to secure by Letters Patent is:

1. A valve for controlling fluid flow comprising:
    a. a housing having a bore extending longitudinally within the housing;
    b. a continuous shaft extending longitudinally within the housing bore and adapted to reciprocate longitudinally therein;
    c. first pistons spaced and fixed on the shaft for forming a chamber within the housing bore;
    d. an inlet or outlet port into the housing chamber for connection to fluid under pressure;
    e. a movable piston journalled on the shaft and adapted to slide longitudinally thereon within the chamber;
    f. an annular orifice groove extending longitudinally within the movable piston;
    g. an outlet or inlet port in the housing communicating with said annular orifice groove and isolated from said chamber;
    h. valve seat fixed on the shaft and adapted to selectively close and open said orifice;
    i. stops on the housing for limiting longitudinal movement of the movable piston;
    j. and signal means for longitudinally moving said shaft.

2. A valve for controlling fluid flow comprising:
    a. a housing having a bore extending longitudinally within the housing;
    b. a continuous shaft extending longitudinally within the housing bore and adapted to reciprocate longitudinally therein;
    c. partitions fixed on the housing and forming a chamber within the bore;
    d. an inlet or outlet port into the housing chamber through a said partition for connection to fluid under pressure;
    e. a valve seat on the shaft adapted to selectively open and close the inlet to the chamber;
    f. and means for longitudinally moving said shaft; wherein said inlet or outlet port comprises an annular orifice groove in the partition.

3. A valve for controlling fluid flow or regulating fluid pressure comprising:
    a. a housing having a bore extending longitudinally within the housing;
    b. a shaft extending longitudinally within the housing bore at the center thereof and adapted to reciprocate longitudinally therein;
    c. first and second partitions fixed on the housing and forming a chamber within the bore;
    d. an input orifice through said first partition into said chamber and an outlet orifice through said second partition connecting to said chamber;
    e. valve seats slidably secured on the shaft and adapted to move longitudinally thereon;
    f. and means for selectively reciprocating the shaft longitudinally within the housing for selectively seating the valve seats on the inlet and outlet orifices to control flow or regulate pressure.

4. A valve of claim 3 in combination with rotary index means for rotating said shaft whereby said seats are programmed to be selectively engaged.

5. A valve for controlling fluid flow comprising:
    a. a housing having a bore extending longitudinally within the housing;
    b. partitions within the housing and forming a chamber within the bore;
    c. a continuous shaft extending longitudinally within the housing bore and adapted to reciprocate longitudinally therein through a central bore located in the partitions;
    d. an inlet or outlet port into the housing chamber through a said partition for connection to fluid under pressure;
    e. a valve seat on the shaft adapted to selectively open and close the inlet or outlet port to the chamber;
    f. and means for longitudinally moving said shaft;
    wherein said inlet or outlet port comprises a series of concentrically spaced ports isolated from the housing chamber by the partition and encircling said central bore.

* * * * *